United States Patent
Yang et al.

(10) Patent No.: US 9,137,674 B2
(45) Date of Patent: Sep. 15, 2015

(54) METHOD, SYSTEM, AND DEVICE FOR TRANSMITTING STARTUP PHASE INDICATOR AND SELECTING GATEWAY NODE

(75) Inventors: Yi Yang, Beijing (CN); Bin Jiao, Beijing (CN); Wei Bao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 183 days.

(21) Appl. No.: 13/701,823

(22) PCT Filed: Sep. 27, 2011

(86) PCT No.: PCT/CN2011/080221
§ 371 (c)(1),
(2), (4) Date: Dec. 3, 2012

(87) PCT Pub. No.: WO2012/041219
PCT Pub. Date: Apr. 5, 2012

(65) Prior Publication Data
US 2013/0070665 A1  Mar. 21, 2013

(30) Foreign Application Priority Data
Sep. 29, 2010 (CN) .......................... 2010 1 0299620

(51) Int. Cl.
*H04W 16/26* (2009.01)
*H04W 24/02* (2009.01)
*H04W 84/04* (2009.01)
(52) U.S. Cl.
CPC .............. *H04W 16/26* (2013.01); *H04W 24/02* (2013.01); *H04W 84/047* (2013.01)
(58) Field of Classification Search
CPC .............................. H04W 48/20; H04W 76/02
See application file for complete search history.

(56) References Cited

U.S. PATENT DOCUMENTS

2010/0311419 A1* 12/2010 Bi ............................ 455/435.1

FOREIGN PATENT DOCUMENTS

| CN | 101651950 A | 2/2010 |
| CN | 102083178 A | 6/2011 |

OTHER PUBLICATIONS

Qualcomm Inc., Start-up procedure for relays, R3-105202,3GPP TSG-RAN WG2 Meeting #71 [online], Aug. 26, 2010, section 4.7.6x and figures 4.7.6x-y, Retrieved from the Internet: http://www.3gpp.org/ftp/tsg_ran/WG2_RL2/TSGR2_71/Docs (3 pgs).

(Continued)

*Primary Examiner* — Brandon Renner
(74) *Attorney, Agent, or Firm* — Gilberto M. Villacorta; Kelly Zeng; Foley & Lardner LLP

(57) ABSTRACT

Disclosed are a method, a system, and a device for transmitting a startup phase indicator and gateway node selection, relating to the technical field of wireless communications, for use in solving the problem in the prior art of the manner of selecting gateway nodes for a relay node (RN) by a mobility management entity (MME). In the present invention, during an attach process between the RN and the MME, the MME confirming whether or not a piece of information indicating the startup phase which the RN is currently performing is received, if yes, then on the basis of the information, confirming the startup phase which the RN is currently performing, if not, on the basis of a preconfigured rule of judging the startup phase of the RN, confirming the startup phase which the RN is currently performing; selecting the gateway nodes for the RN on the basis of the startup phase which the RN is currently performing. Employment of the present invention allows the MME to select the appropriate gateway node for the RN on the basis of the startup phase which the RN is currently performing.

11 Claims, 7 Drawing Sheets

(56) References Cited

OTHER PUBLICATIONS

Search Report mailed Jan. 5, 2012 in International Application No. PCT/CN2011/080221.

"3rd Generation Partnership Project; 1-15 Technical Specification Group Services and System Aspects; General Packet Radio Service (GPRS) Enhancements for Evolved Universal Terrestrial Radio Access Network E-UTRAN) access (Release 10)",3GPP Standard; vol. 10.0.0, Jun. 10, 2010, pp. 1-261, XP050441572.

Catt: "S/P-GW selection during RN startup 1-15 procedure", 3GPP Draft; R3-102231, 3rd Generation Partnership Project (3GPP), vol. RAN WG3, Aug. 15, 2010, XP050453107.

Qualcomm Incorporated: "Start-up procedure for relays", 3GPP Draft; R2-105202 RN STARTUP CR 36300, 3rd Generation Partnership Project \3GPP), vol. RAN WG2, No. Madrid, Spain; 20100823, Aug. 26, 2010, XP050452152.

Search Report mailed Jan. 2, 2014 in European Application No. 11828115.3.

* cited by examiner

METHOD, SYSTEM, AND DEVICE FOR TRANSMITTING STARTUP PHASE INDICATOR AND SELECTING GATEWAY NODE

The present application is a US National Stage of International Application No. PCT/CN2011/080221, filed 27 Sep. 2011, designating the United States, and claiming the benefit of Chinese Patent Application No. 201010299620.1, filed with the Chinese Patent Office on Sep. 29, 2011 and entitled "Method, system and apparatus for transmitting startup phase indicator and selecting gateway node", which is hereby incorporated by reference in its entirety.

FIELD OF THE INVENTION

The present invention relates to the field of wireless communications and particularly to a method, system and apparatus for transmitting a startup phase indicator and selecting gateway nodes.

BACKGROUND OF THE INVENTION

Higher peak data rates and a higher cell throughput will be provided and also a wider bandwidth will be required in a future mobile communication system, e.g, a Beyond Third Generation (B3G) system or a Long Term Evolution-Advanced (LTE-A) system; and there are few existing unallocated bandwidths below 2 GHz, and a part or all of the bandwidth required for a B3G system has to be deployed in a higher frequency band, e.g., above 3 GHz. The higher the frequency band is, the faster the attenuation in radio wave propagation will be and the shorter a transmission distance will be. Thus a large number of base stations will be required to ensure coverage continuity across the same coverage area, and this will inevitably result in an increased network deployment cost due to the costly base stations. In order to address the problems of the network deployment cost and of coverage, various manufactures and standardization organizations come to work on the introduction of a relay into a cellular system for the purpose of coverage improvement.

FIG. 1 is the network architecture of an LTE-A system with deployed Relay Node (RN), where the RN accesses to a core network via a donor cell served by a Donor Evolved Node B (DeNB) and has no direct wired interface to the core network, and each RN can manage one or more cells. In this architecture, an interface between a UE and the RN reuses legacy Uu interface, and an interface between the RN and the DeNB is called the Un interface.

The RN plays two roles in the architecture illustrated in FIG. 1:

Firstly the RN plays the role of a User Equipment (UE), and the startup procedure of the RN is similar as the normal UE attach procedure. The RN has its own Serving Gateway (SGW) and Packet data network Gateway (PGW), and the RN also has its own control node, i.e., Mobility Management Entity (MME); and then Secondly the RN plays the role of an eNB for a UE accessing to the RN, and at this time, downlink user data of the UE are transmitted from the SGW/PGW of the UE to the RN, and then transmitted from the RN to the UE via the Uu interface.

The startup process of RN consists of the following two phases:

In Phase I, the RN attaches to EPS network as a UE and then retrieves initial configuration parameters, including Donor eNB (DeNB) cells list, from the OAM system, and then the RN detaches from the network. In this phase, the eNB selects a MME for the RN, and the MME selects SGW and PGW for the RN as a normal UE.

In Phase II, the RN selects an accessible DeNB from the list of DeNB cells and establishes an RRC connection with the DeNB; the DeNB selects an appropriate MME for the RN, and the MME selects gateway nodes for the RN; the DeNB further establishes a default bearer and several required dedicated bearers for the RN, and then the OAM system downloads configuration information to the RN and completes RN configuration; and the RN can operate normally as an eNB after establishing necessary S1 and X2 interfaces with the DeNB.

In the Phase I, the eNB and the MME accessed by the RN can be legacy apparatuses, i.e., apparatuses which do not support an RN. In the Phase II, the eNB and the MME accessed by the RN must support RN functionality.

In the prior art, the UE in idle state initiates an RRC connection setup procedure when the upper layer of the UE requests to establish an RRC connection with an eNB. Specifically the UE selects an appropriate cell and sends to an Evolved Universal Terrestrial Radio Access Network (E-UTRAN) an RRC connection request message in which the UE notifies the E-UTRAN of a establishment cause including a signaling connection initiated by the UE, a data transmission connection initiated by the UE, an emergent call, a access with high-priority, an access of called UE, etc. There are also three reserved cause values.

The E-UTRAN in FIG. 3 refers to an access network node, particularly an eNB, an RN, a Home Evolved Node B (HeNB), a DeNB and other base stations. Non Access Stratum (NAS) behaviors to trigger the RRC connection setup procedure include Attach Request, Service Request, Tracking Area Update (TAU) and Detach Request. The UE embeds the NAS message in RRC Connection Setup Complete message transmitted to the E-UTRAN.

The E-UTRAN selects an MME for the UE upon reception of the RRC Connection Setup Complete message from the UE, includes the NAS message, carried in the RRC Connection Setup Complete message, in the initial UE message and then transmits the initial UE message to the MME via an S1 interface as illustrated in FIG. 4. The E-UTRAN will put the RRC establishment cause, obtained from the RRC connection request message, in the initial UE message and then transmit to the MME.

The UE carries an identity in the Attach Request message upon attachment. If the UE has no valid Globally Unique Temporary Identity (GUTI), the UE uses an International Mobile Subscriber Identity (IMSI) as its own identity. If the UE still has a valid GUTI upon attachment, then the UE uses the GUTI as its own identity. The GUTI is allocated by the MME to the UE in place of the permanent identity IMSI of the UE to prevent a user identity from being leaked due to the frequent use of the IMSI. The MME can reallocate a GUTI to the UE when the UE is attached or updated in location update or when necessary otherwise.

The MME authenticates the UE upon reception of the attach request from the UE and obtains subscription data of the UE from a Home Subscriber Server after a successful authentication and then selects SGW and PGW for the UE. An existing method for selecting a PGW can be based on a default Access Point Name (APN) in the subscription data or an APN requested by the UE in the NAS message. A principle of SGW selection is primarily to select an SGW at a close distance and with a low load according to the geographical location where the UE currently resides.

The inventors have found the following technical problems in the prior art during making of the invention:

A solution is absent to how to select SGW/PGW by MME for the RN in the phase I and the phase II of the existing RN startup procedure. If the eNB selected in the phase I by the RN is a legacy eNB which doesn't support RN functionality, but the MME supports RN functionality, then the current serving eNB will return error information if the MME selects the current serving eNB as gateway nodes of the RN, so that the RN has to reselect another eNB until the RN selects a suitable DeNB, and only then the RN can finish the startup procedure successfully, which will unpredictably increase a period of RN startup procedure. If the MME selects legacy SGW/PGW as gateway nodes of the RN in the phase II as in the prior art, then the RN will repeat constantly the process of the phase I and can not enter the normal operation.

SUMMARY OF THE INVENTION

Embodiments of the invention provide a method of transmitting a startup phase indicator and a relay node so as to address the problem of an MME failing to get knowledge of a startup phase which an RN is currently performing.

A method for transmitting a startup phase indicator includes:

judging, by an RN, a current startup phase; and determining, by the RN, from a result of judgment whether to transmit, to an eNB or an MME, information for indicating the startup phase which the RN is currently performing and transmitting to the eNB or the MME the information for indicating the startup phase which the RN is currently performing upon positive determination.

A relay node includes:

a phase judging unit configured to judge a current startup phase;

an indicator determining unit configured to determine from a result of judgment by the phase judging unit whether to transmit, to an eNB or an MME, information for indicating the startup phase which the RN is currently performing; and a phase indicating unit configured to transmit to the eNB or the MME the information for indicating the startup phase which the RN is currently performing upon positive determination by the indicator determining unit.

In the solutions according to the embodiments of the invention, the RN decides, according to startup phase, which the RN is currently performing, information for indicating the startup phase which the RN is currently performing to be or not to be transmitted to the eNB or the MME, so that the MME can judge the startup phase which the RN is currently performing according to whether the information is received and the specific content of the information.

An embodiment of the invention further provides a method for forwarding a startup phase indicator and an eNB so as to address the problem of how an RN transmits, to an MME, information for indicating a startup phase.

A method for forwarding a startup phase indicator includes:

receiving, by an eNB, information for indicating the startup phase which the RN is currently performing, transmitted from an RN; and forwarding, by the eNB, to an MME selected for the RN the information for indicating the startup phase which the RN is currently performing.

An eNB includes:

an information receiving unit configured to receive information for indicating a startup phase which the RN is currently performing, transmitted from an RN; and an information forwarding unit configured to forward to an MME selected for the RN the information for indicating the startup phase which the RN is currently performing.

In the solutions according to the embodiments of the invention, the eNB forwards to the MME the received information for indicating the startup phase which the RN is currently performing, transmitted from the RN, so that the information for indicating the startup phase which the RN is currently performing, transmitted from the RN, can arrive at the MME.

Embodiments of the invention further provide a method for selecting gateway nodes, a mobility management entity and a wireless communication system so as to address the problem of how an MME selects gateway nodes for an RN.

A method for gateway node selection includes:

determining, by an MME, whether information, transmitted from an RN or an eNB, for indicating a startup phase which the RN is currently performing is received during RN attach procedure, and if so, then judging from the received information the current startup phase; otherwise, judging the startup phase which the RN is currently performing based on a preconfigured rule of judging the startup phase of the RN; and selecting, by the MME, a legacy Serving Gateway, SGW, and a legacy packet data gateway, PGW, as gateway nodes of the RN upon judging that the RN currently performs a startup phase I; and selecting, by the MME, a Donor eNB, DeNB, of the RN as PGW and SGW of the RN upon judging that the RN is currently performing a startup phase II.

A mobility management entity includes:

a phase judging unit configured to determine whether information, transmitted from an RN or an eNB, for indicating a startup phase which the RN is currently performing is received during RN attach procedure, and if so, to judge from the received information the startup phase which the RN is currently performing; otherwise, to judge the startup phase which the RN is currently performing based on a preconfigured rule of judging the startup phase of the RN; and a gateway selection unit configured to select a legacy Serving Gateway, SGW, and a legacy packet data gateway, PGW, as gateway nodes of the RN when the phase judging unit judges that the RN currently performs a startup phase I; and to select a Donor eNB, DeNB, of the RN as PGW and SGW of the RN when the phase judging unit judges that the RN currently performs a startup phase II.

A wireless communication system includes:

an RN configured to judge a current startup phase, to determine from a result of judgment whether to transmit, to an eNB or an MME, information for indicating the startup phase which the RN is currently performing and to transmit to the eNB the information for indicating the startup phase which the RN is currently performing upon positive determination;

the eNB configured to forward to the MME selected for the RN the information for indicating the startup phase which the RN is currently performing upon reception of the information; and the MME configured to determine whether the information, transmitted from the eNB, for indicating the startup phase which the RN is currently performing is received during RN attach procedure, and if so, to judge from the received information the startup phase which the RN is currently performing; otherwise, to judge the startup phase based on a preconfigured rule of judging the startup phase of the RN; and to select a legacy Serving Gateway, SGW, and a legacy packet data gateway, PGW, as gateway nodes of the RN upon judging that the RN currently performs a startup phase I, and to select a Donor eNB, DeNB, of the RN as PGW and SGW of the RN upon judging that the RN currently performs a startup phase II.

A wireless communication system includes:

a Relay Node, RN, configured to judge a current startup phase, to determine from a result of judgment whether to transmit, to a Mobility Management Entity, MME, information for indicating the startup phase which the RN is currently performing and to transmit to the MME the information for indicating the startup phase which the RN is currently performing upon positive determination; and the MME configured to deter line whether the information, transmitted from the RN, to indicate the startup phase which the RN is currently performing is received during RN attach procedure, and if so, to judge from the received information the startup phase which the RN is currently performing; otherwise, to judge the startup phase based on a preconfigured rule of judging the startup phase of the RN; and to select a legacy Serving Gateway, SGW, and a legacy packet data gateway, PGW, as gateway nodes of the RN upon judging that the RN currently performs a startup phase I, and to select a Donor eNB, DeNB, of the RN as PGW and SGW of the RN upon judging that the RN currently performs a startup phase II.

In the solutions according to the embodiments of the invention, the RN decides, according to the startup phase which the RN is currently performing, information for indicating the startup phase which the RN is currently performing to be or not to be transmitted to the eNB or the MME; the eNB forwards to the MME the received information for indicating the startup phase which the RN is currently performing; and the MME judges the startup phase which the RN is currently performing according to the received information for indicating the startup phase which the RN is currently performing or based on a preconfigured rule of judging the startup phase and selects a legacy Serving Gateway (SGW) and a legacy packet data gateway (PGW) as gateway nodes of the RN upon judging that the RN currently performs the startup phase I; and selects a Donor eNB (DeNB) of the RN as PGW and SGW of the RN upon judging that the RN currently performs the startup phase II. As can be apparent, with the invention, the MME can select gateway nodes for the RN according to the startup phase which the RN is currently performing to thereby address the problem of how the MME selects gateway nodes for the RN.

DETAILED DESCRIPTION OF THE EMBODIMENTS

In order to address the problem of how an MME selects gateway nodes for an RN, embodiments of the invention provide a method for indicating a startup phase, a method for forwarding startup phase indicator and a method for gateway node selection, and in this method, an RN decides to transmit or not transmit information, for indicating the current startup phase, to the serving eNB or MME according to a startup phase which the RN is currently performing; the eNB forwards to the MME the received information for indicating the startup phase which the RN is currently performing; and the MME judges the startup phase which the RN is currently performing according to whether the information for indicating the startup phase which the RN is currently performing is received and the content of the information, and selects appropriate gateway nodes for the RN according to the startup phase.

Figure 5:
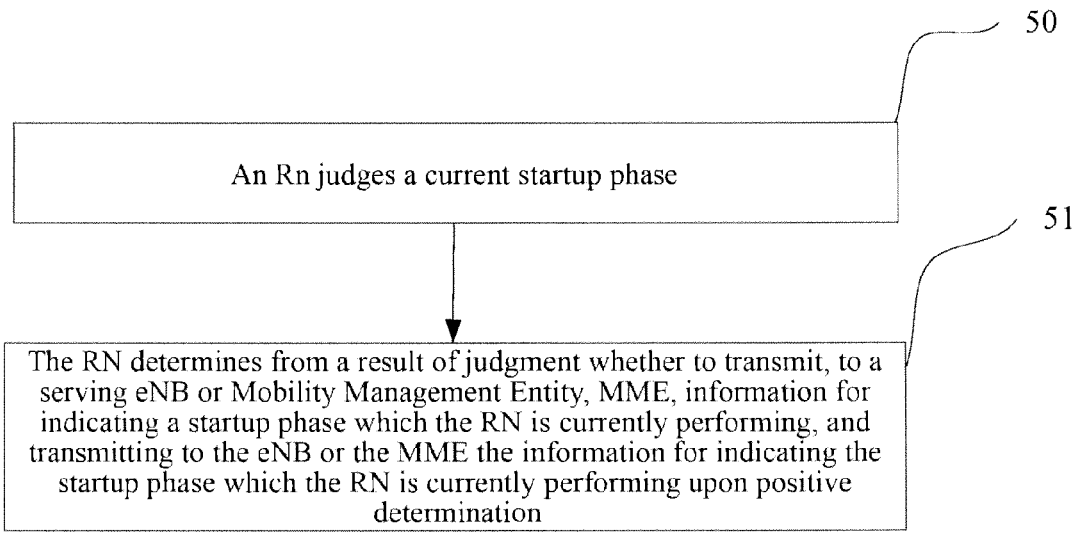
FIG. 5 is a schematic flow chart of a method according to an embodiment of the invention.

Referring to FIG. 5, an embodiment of the invention provides a method for transmitting a startup phase indicator, and this method particularly includes the following steps:

Step 50: An RN judges the currently performed phase of a startup procedure; and

Step 51: The RN determines from a result of judgment whether to transmit, to the serving eNB or MME, information for indicating the startup phase which the RN is currently performing and transmits to the eNB or the MME the information for indicating the startup phase which the RN is performing upon positive determination.

The step 51 can be performed particularly in the following three schemes:

In a first scheme, the RN determines that it is unnecessary to transmit to the eNB or the MME the information for indicating the startup phase which the RN is performing upon judging that a phase I of the startup procedure is being performed; and determines that it is necessary to transmit, to the eNB or the MME, information for indicating that the RN is currently performing a startup phase II upon judging that the phase II of the startup procedure is being performed and transmits to the eNB or the MME the information for indicating that the RN is currently performing the startup phase II.

In a second scheme, the RN determines that it is necessary to transmit, to the eNB or the MME, information for indicating that the RN is currently performing a startup phase I upon judging that the phase I of the startup procedure is being performed and transmits to the eNB or the MME the information for indicating that the RN is currently performing the startup phase I; and determines that it is necessary to transmit, to the eNB or the MME, information for indicating that the RN is currently performing a startup phase II upon judging that the phase II of the startup procedure is being performed and transmits to the eNB or the MME the information for indicating that the RN is currently performing the startup phase II.

In a third scheme, the RN determines that it is necessary to transmit to the eNB or the MME the information for indicating the startup phase which the RN is currently performing upon judging that a phase I of the startup procedure is being performed and transmits, to the eNB or the MME, information for indicating that the RN is currently performing the startup phase I; and determines that it is unnecessary to transmit to the eNB or the MME the information for indicating the startup phase which the RN is currently performing upon judging that a phase II of the startup procedure is being performed.

The information for indicating that the RN is currently performing the startup phase I can be identity information of a UE, or an International Mobile Subscriber Identity (IMSI) or indicator information of the startup phase I, where the identity information of the UE is information indicating the type of the current communication node as a UE, and the indicator information of the startup phase I is information indicating the startup phase I.

The information for indicating that the RN is currently performing the startup phase II can be identity information of the RN, or a Globally Uniquely Temporary Identifier (GUTI), or indicator information of the startup phase II, or indicator information requesting a local gateway to be selected, where the identity information of the RN is information indicating the current communication node type as an RN, and the indicator information of the startup phase II is information indicating the startup phase II.

In the step 51, the RN can transmit to the eNB the information for indicating the startup phase, which the RN is currently performing, in an Access Stratum (AS) message and transmit to the MME the information to indicate the startup phase, which the RN is currently performing, in a Non Access Stratum (NAS) message.

Of course the RN can alternatively transmit to the eNB or the MME the information for indicating the startup phase, which the RN is currently performing, in any other message which can be an existing or newly defined message.

Specifically the AS message can be an RRC connection setup request message, an RRC connection setup complete message, etc. The NAS message can be an Attach Request message, or a Packet Data Network (PDN) Connectivity Request message, etc.

When the RN transmits to the eNB the information for indicating the startup phase, which the RN is currently performing, in an RRC connection setup request message, the information for indicating the startup phase which the RN is currently performing can be carried in an RRC establishment cause field of the RRC connection setup request message; and of course the information can alternatively be carried in another existing or newly added field. When the RN transmits to the eNB the information for indicating the startup phase which the RN is currently performing in an RRC connection setup complete message, an access entity type indicator field can be added in the RRC connection setup complete message, and the information for indicating the startup phase which the RN is currently performing can be carried in the access entity type indicator field. Of course the information can alternatively be carried in another newly added field.

This method can be performed in the following several embodiments:

First Embodiment

Step 1: An RN is powered up for startup, determines that it is unnecessary to transmit, to the serving eNB or MME, information for indicating the startup phase which the RN is currently performing upon judging that a phase I of the startup procedure is being performed and completes the startup phase I as in the existing procedure; and Step 2: The RN enters a phase II of the startup procedure, determines that it is necessary to transmit to the eNB or the MME the information for indicating the startup phase which the RN is currently performing and transmits identity information of the RN or indicator information of the startup phase II to the eNB in an AS message, or transmits identity information of the RN or indicator information of the startup phase II to the MME in an NAS message, while performing the phase II of the startup procedure.

Second Embodiment

Step 1: An RN is powered up for startup, determines that it is necessary to transmit, to the serving eNB or MME, information for indicating the startup phase which the RN is currently performing upon judging that a phase I of the startup procedure is being performed and transmits identity information of a UE to the eNB in an AS message or to the MME in an NAS message while performing the phase I of the startup procedure; and Step 2: The RN enters the phase II of the startup procedure, determines that it is necessary to transmit to the eNB or the MME the information for indicating the startup phase which the RN is currently performing and transmits identity information of the RN to the eNB in an AS message or transmits identity information of the RN to the MME in an NAS message when performing the phase II of the startup procedure.

Third Embodiment

Step 1: An RN is powered up for startup, determines that it is necessary to transmit, to the serving eNB or MME, information for indicating the startup phase which the RN is currently performing upon judging that a phase I of the startup procedure is being performed and transmits an IMSI of the RN to the eNB in an AS message or to the MME in an NAS message while performing the phase I of the startup procedure; and Step 2: The RN enters a phase II of the startup procedure, determines that it is necessary to transmit to the eNB or the MME the information for indicating the startup phase which the RN is currently performing and transmits a GUTI of the RN to the eNB in an AS message or transmits MITI identity information of the RN to the MME in an NAS message when performing the phase II of the startup procedure.

Fourth Embodiment

Step 1: An RN is powered up for startup, determines that it is necessary to transmit, to the serving eNB or MME, information for indicating the startup phase which the RN is currently performing upon judging that a phase I of the startup procedure is being performed and transmits indicator information of the startup phase I to the eNB in an AS message or to the MME in an NAS message while performing the phase I of the startup procedure; and Step 2: The RN enters a phase II of the startup procedure, determines that it is necessary to transmit to the eNB or the MME the information for indicating the startup phase which the RN is currently performing and transmits indicator information of the startup phase II to the eNB in an AS message or transmits indicator information of the startup phase II to the MME in an NAS message when performing the phase II of the startup procedure.

Figure 6:
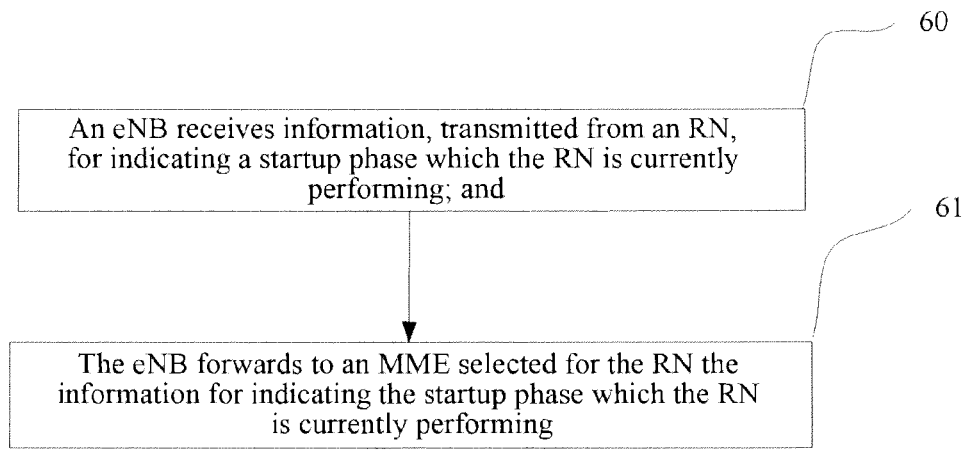
FIG. 6 is a schematic flow chart of a method according to an embodiment of the invention.

Referring to FIG. 6, an embodiment of the invention provides a method for forwarding a startup phase indicator, and this method particularly includes the following steps:

Step 60: An eNB receives information for indicating the startup phase which the RN is currently performing transmitted from an RN; and Step 61: The eNB forwards to an MME selected for the RN the information for indicating the startup phase which the RN is currently performing.

In the step 60 and the step 61, the information for indicating the startup phase which the RN is currently performing is information for indicating that the RN is currently performing a startup phase I or information for indicating that the RN is currently performing a startup phase II.

The information for indicating that the RN is currently performing the startup phase I can be identity information of a UE or an IMSI or indicator information of the startup phase I, where the identity information of the UE is information indicating the type of the current communication node as a UE, and the indicator information of the startup phase I is information indicating the startup phase I.

The information for indicating that the RN is currently performing the startup phase II can be identity information of the RN or a GUTI or indicator information of the startup phase II or indicator information requesting a local gateway to be selected, where the identity information of the RN is information indicating the type of the current communication node as an RN, and the indicator information of the startup phase II is information indicating the startup phase II.

In the step 60, the eNB can receive the information, transmitted from the RN, for indicating the startup phase, which the RN is currently performing in an AS message which is an RRC connection setup request message, or an RRC connection setup complete message, etc.

When the AS message is the RRC connection setup request message, the eNB can read the information for indicating the startup phase which the RN is currently performing from an RRC establishment cause field of the RRC connection setup request message; and of course, can alternatively read the information for indicating the startup phase which the RN is currently performing from another existing or newly defined field. When the AS message is the RRC connection setup complete message, the eNB can read the information for indicating the startup phase which the RN is currently performing from an entity type indicator field of the RRC connection setup complete message; and of course, can alternatively read the information for indicating the startup phase which the RN is currently performing from another field.

In the step 61, the eNB can forward to the MME, the information for indicating the startup phase, which the RN is currently performing in an S1-AP message which can be an initial UE message, etc.

For example, when the eNB reads the information for indicating the startup phase which the RN is currently performing from an RRC establishment cause field of an RRC connection setup request message, the eNB can transmit an S1-AP message to the MME after carrying the RRC establishment cause field directly in the S1-AP message. In another example, when the eNB reads the information for indicating the startup phase which the RN is currently performing from an entity type indicator field of an RRC connection setup complete message, the eNB can add an entity type indicator field in an S1-AP message, carry the information for indicating the startup phase which the RN is currently performing in the entity type indicator field and transmit the S1-AP message carrying the entity type indicator field to the MME.

Figure 7:
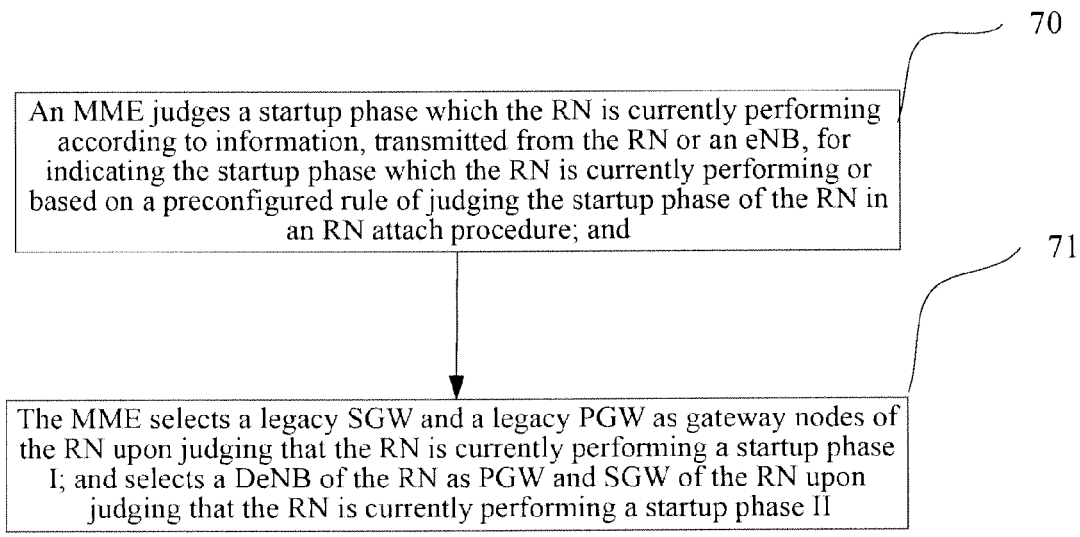
FIG. 7 is a schematic flow chart of a method according to an embodiment of the invention.

Referring to FIG. 7, an embodiment of the invention further provides a method for selecting a gateway node, and this method particularly includes the following steps:

Step 70: An MME determines whether information, transmitted from an RN or an eNB, for indicating the startup phase which the RN is currently performing is received during RN attach procedure, and if so, then the MME judges from the received information the startup phase which the RN is currently performing; otherwise, the MME judges the startup phase which the RN is currently performing according to a preconfigured rule of judging the startup phase of the RN; and Step 71: The MME selects a legacy SGW and a legacy PGW as gateway nodes of the RN upon judging that the RN is currently performing a startup phase I; and selects the DeNB of the RN as PGW and SGW of the RN upon judging that the RN is currently performing a startup phase II.

In the step 70, determination can be made particularly as follows regarding whether information, transmitted from an RN or an eNB, for indicating the startup phase which the RN is currently performing is received:

The MME determines whether an S1-AP message transmitted from the eNB carries the information for indicating the startup phase which the RN is currently performing; and if so, then the MME determines that the information, transmitted from the eNB, for indicating the startup phase which the RN is currently performing is received; otherwise, the MME determines that the information, transmitted from the eNB, for indicating the startup phase which the RN is currently performing is not received. The MME determines whether an NAS message transmitted from the RN carries the information for indicating the startup phase which the RN is currently performing; and if so, then the MME determines that the information, transmitted from the RN, for indicating the startup phase which the RN is currently performing is received; otherwise, the MME determines that the information, transmitted from the RN, for indicating the startup phase which the RN is currently performing is not received. Here the S1-AP message can be an initial UE message, etc., and the NAS message can be an Attach Request message, or a PDN Connectivity Request message, etc.

Further the MME can determine whether an RRC establishment cause indicator field of the S1-AP message transmitted from the eNB carries the information for indicating startup phase which the RN is currently performing or determine whether the S1-AP message carries an access entity type indicator field as the information for indicating the startup phase which the RN is currently performing; and if so, then the MME determines that the information, transmitted from the eNB, for indicating the startup phase which the RN is currently performing is received; otherwise, the MME determines that the information, transmitted from the eNB, for indicating the startup phase which the RN is currently performing is not received.

In the step 70, the MME can judge from the received information the current startup phase particularly as follows:

When the information, received by the MME, for indicating that the RN is currently performing the startup phase I is identity information of a UE or an IMSI or indicator information of the startup phase I, the MME judges that the RN is currently performing the startup phase I, where the identity information of the UE is information indicating the type of the current communication node as a UE, and the indicator information of the startup phase I is information indicating the startup phase I; and When the information, received by the MME, for indicating that the RN is currently performing the startup phase II is identity information of the RN or a GUTI or indicator information of the startup phase II or indicator information requesting a local gateway to be selected, the MME judges that the RN is currently performing the startup phase II, where the identity information of the RN is information indicating the type of the current communication node as an RN, and the indicator information of the startup phase II is information indicating the startup phase II.

In the step 70, the rule of judging the startup phase of the RN can be to judge that the RN is currently performing the startup phase II when the information for indicating the startup phase which the RN is currently performing is not received. Of course, it can alternatively be judged that the RN is currently performing the startup phase I when the information for indicating the startup phase which the RN is currently performing is not received.

Preferably in the step 71, the MME shall firstly determine whether the current communication node is an RN according to user subscription data obtained from a Home Subscriber Server (HSS) after judging that the RN is currently performing the startup phase II and before selecting the DeNB of the RN as the PGW and the SGW of the RN; and if so, then the MME selects the DeNB of the RN as the PGW and the SGW of the RN; otherwise, the MME selects a legacy SGW and a legacy PGW located in the core network as gateway nodes of the RN.

In the step 71, after selecting the DeNB of the RN as the PGW and the SGW of the RN, the MME can take the address of the DeNB as the address of the gateway node selected for the RN or query a DNS system using the eNB identifier (eNB ID) of the DeNB for retrieving the address of a gateway function part of the DeNB and take the retrieved address as the address of the gateway node selected for the RN.

This method can be performed in the following several embodiments:

Fifth Embodiment

Step 1: An MME receives an S1-AP message transmitted from an eNB in a startup procedure of an RN when the RN accesses to a network; and Step 2: The MME determines that the RN performs a startup phase I upon determining that the S1-AP message does not carry information for indicating the startup phase which the RN is currently performing or carries identity information of a UE or carries an IMSI or carries indicator information of the startup phase I; and Step 3: The MME selects for the RN a legacy SGW and a legacy PGW located in the core network as gateway nodes of the RN as in the prior art.

Sixth Embodiment

Step 1: An MME receives an S1-AP message transmitted from an eNB in a startup procedure of an RN when the RN accesses to a network; and Step 2: The MME determines that the RN performs a startup phase II upon determining that the S1-AP message carries identity information of the RN or carries a GUTI or carries indicator information of the startup phase II or indicator information requesting a local gateway to be selected; and Step 3: The MME selects the DeNB of the RN as PGW and SGW of the RN.

Seventh Embodiment

Step 1: An MME receives an NAS message transmitted from an RN in a startup procedure of the RN when RN accesses to a network; and Step 2: The MME determines that the RN performs a startup phase I upon determining that the NAS message does not carry information to indicate the startup phase which the RN is currently performing or carries identity information of a UE or carries an IMSI or carries indicator information of the startup phase I; and Step 3: The MME selects for the RN a legacy SGW and a legacy PGW located in the core network as gateway nodes of the RN as in the prior art.

Eighth Embodiment

Step 1: An MME receives an NAS message transmitted from an RN in a startup procedure of the RN accessing to a network; and Step 2: The MME determines that the RN performs a startup phase II upon determining that the NAS message carries identity information of the RN or carries a GUTI or carries indicator information of the startup phase II or indicator information requesting a local gateway to be selected; and Step 3: The MME selects the DeNB of the RN as the PGW and SGW of the RN.

The invention will be described in details as follows:

A general idea of the invention lies in that when an MME selects gateway nodes for an RN, the MME determines from obtained NAS or AS information which phase the RN performs and thereby selects a corresponding gateway node. The MME selects the serving eNB (DeNB) as the SGW/PGW of the RN if it is determined that the RN is performing a phase II of a startup process.

At the MME side:

Selecting an appropriate gateway node for the access entity according to obtained NAS identity information or the type of the access entity; and Selecting an appropriate gateway node for the access entity according to obtained AS identity information or the type of the access entity;

When the RN has selected a DeNB as a serving eNB, selecting the DeNB as the SGW/PGW of the RN; otherwise, selecting legacy SGW/GPW located in the core network as the existing mechanism of selecting a node.

At the eNB side:

Notifying the MME in an S1-AP message that the access entity is an RN.

At the RN side:

Determining whether a phase I or a phase II of a startup procedure is performed;

No identity indicator information of the RN is carried in the phase I; and the identity indicator information of the RN is carried in the phase II;

Identity indicator information of a UE is carried in the phase I; and the identity indicator information of the RN or indicator information requesting a local gateway to be selected is carried in the phase II;

The identity indicator information of the RN can be put in an NAS message or can alternatively be carried in an RRC message; and The indicator information can be explicit or can alternatively be implicit.

Ninth Embodiment

In this embodiment, information for indicating the startup phase which the RN is currently performing is transmitted in an AS message particularly as follows:

Step 1: An RN is powered up to perform the procedure of the phase I in FIG. 2. In this process:

The RN establishes an RRC connection with an eNB. The RN carries no identity information of the RN or carries identity information of a UE in an RRC Connection Request or RRC Connection Setup Complete message.

If the serving eNB of the RN selects an MME which supports RN functionality, then the MME determines that the RN is performing the phase I (that is, what selected by the RN may be an eNB) upon knowledge of the RN accessing a network (e.g., from subscription data obtained from an HSS) because the MME obtains no identity of the RN from an initial UE message transmitted from the serving eNB of the RN or obtains the identify information of the UE, so the MME selects legacy SGW/PGW for the RN as in the prior art.

If the RN carries no identity information of the RN in this phase, then it means that an information element of the identity information of the RN can be set as an optional element in designing of the RRC message. If the RN carries the identity information of the UE in this phase, then it means that information element of the identity information of the UE can be set as a mandatory element in designing of the RRC message.

As an optimized alternative, the RN can firstly select a DeNB cell from a stored list of DeNB cells (if any) before attachment each time, and if none of detected cells is available, then the RN can further perform the phase I to download a new list of DeNB cells. If some of the detected cells are available, then the RN can perform the phase II directly and skip the process of the phase I. For example, the RN may not perform the process of the phase I when powered up again if the RN is powered off and moved to another location after operating as an eNB for a period of time.

Step 2: The RN performs the phase II in FIG. 2. In this process:

The RN selects an available DeNB cell, and the RN carries identity information of the RN in an RRC Connection Request or RRC Connection Setup Complete message.

Particularly if the RN carries the identity information in an RRC Connection Request message, then the RN can indicate in an RRC establishment cause field that an RN is accessing. If the RN carries the identity information of the RN in an RRC Connection Setup Complete message, then the RN can add an entity type indicator field in the message and set the value of the field to RN.

The DeNB selects for the RN an MME which supports RN functionality. If the DeNB knows the identity information of the RN from the RRC establishment cause field, then the DeNB includes the RRC establishment cause field in an S1-AP message transmitted to the MME (that is, transmitted transparently to the MME without modification) as in the prior art. Alternatively the DeNB can add an access entity type indicator field in the S1-AP message to carry the identity information of the RN.

If the MME knows the identity information of the RN from an RRC Establishment Cause IE field in the initial UE message or knows from the initial UE message that the type of the access entity is an RN, then the MME checks subscription data for an RN information indicator. If the MME knows from an HSS that the type of the user is an RN indeed, then the MME determines that the RN is performing the process of the phase II and then selects the current serving eNB, that is, the DeNB acts as both a PGW and an SGW of the RN; otherwise, the MME determines that the access entity is not an RN or the RN is performing the process of the phase I and performs the existing mechanism of selecting an SGW/PGW.

After selecting the DeNB as the SGW/PGW, the MME can take the IP address of the DeNB directly as the IP address of the gateway node or can alternatively inquire a DNS system using the eNB identifier of the DeNB for retrieving the IP address of a gateway function part of the DeNB.

Figure 1:
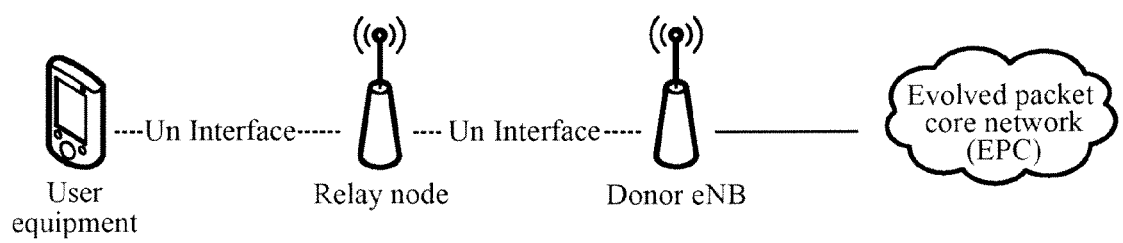
FIG. 1 is an architectural diagram of a network including an RN in the prior art.
Figure 2:
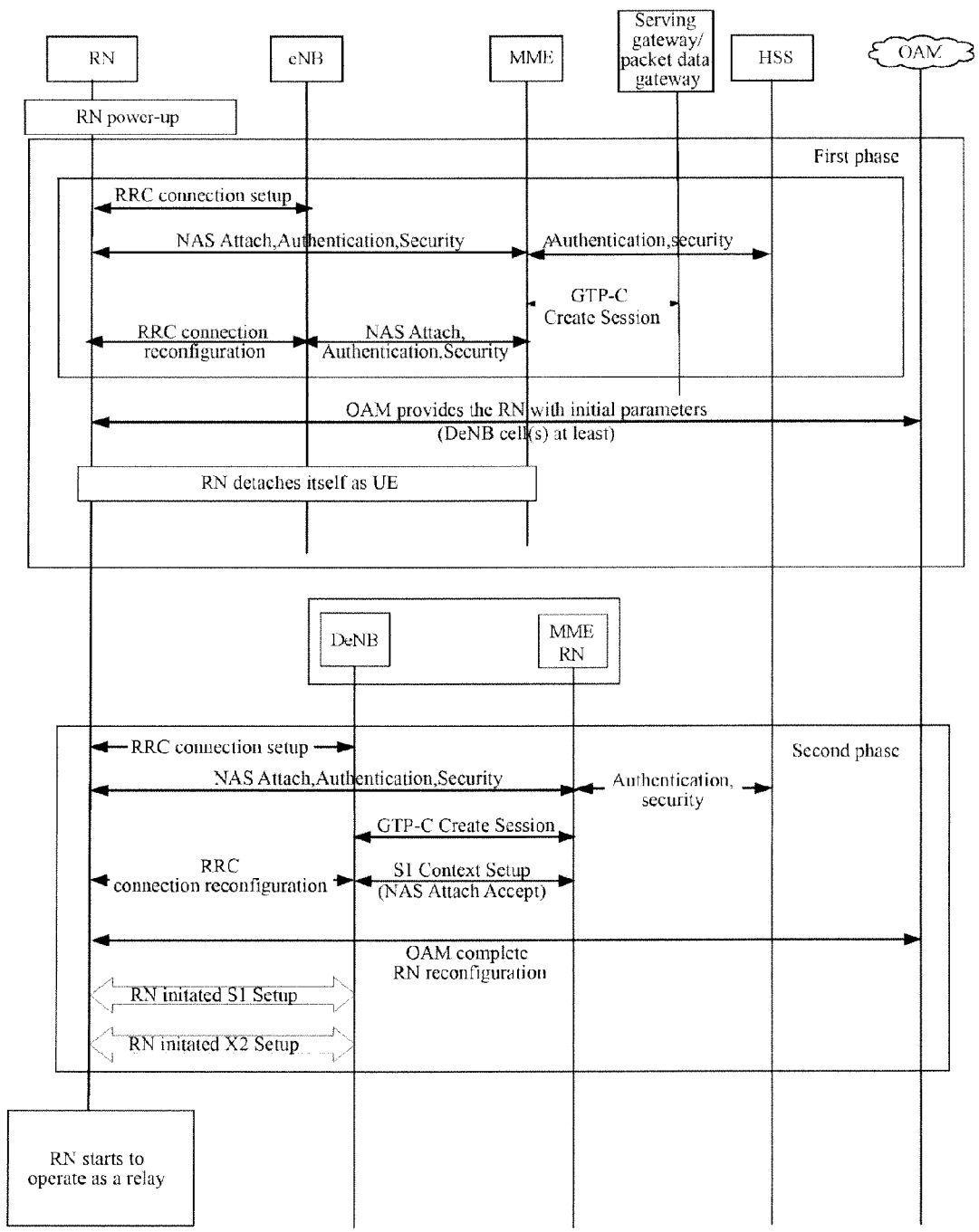
FIG. 2 is a schematic diagram of a process of startup an RN in the prior art.
Figure 3:
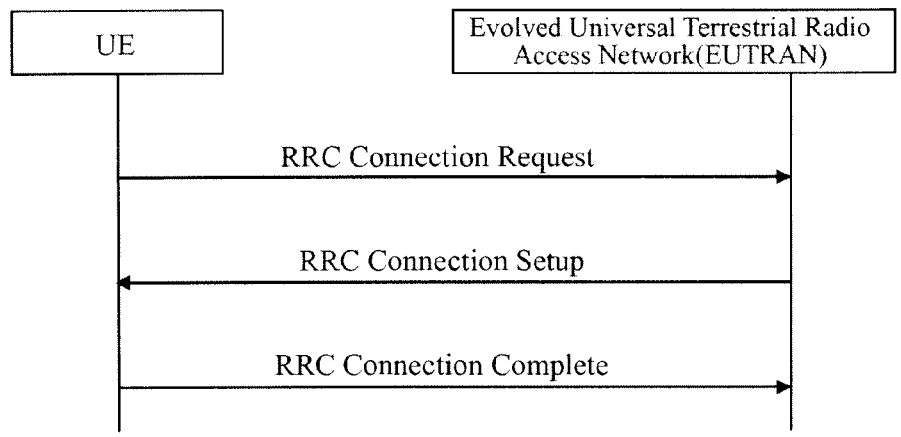
FIG. 3 is a schematic diagram of a process of establishing an RRC connection in the prior art.
Figure 4:
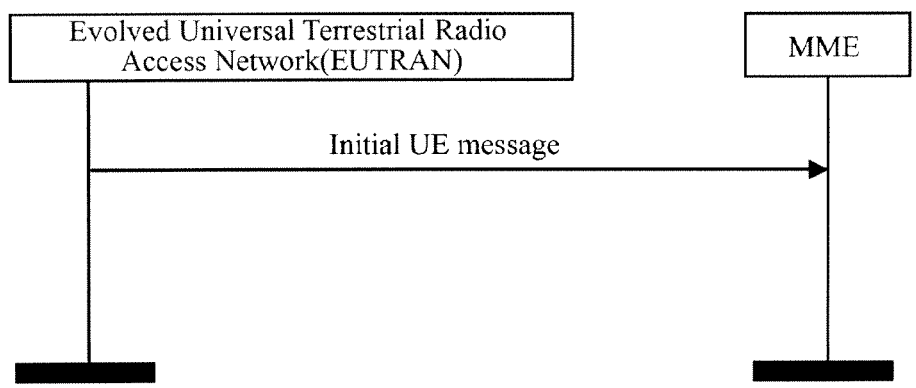
FIG. 4 is a schematic diagram of transmission of an initial UE message in the prior art.

The MME transmits a Create Session Request to the DeNB, and the DeNB creates at least a default EPS bearer for the RN; and a subsequent process is performed as in the corresponding steps in the phase II in FIG. 2, and a repeated description thereof will be omitted here.

Tenth Embodiment

In this embodiment, information for indicating the startup phase which the RN is currently performing is transmitted in an NAS message particularly as follows:

Step 1: An RN is powered up to perform the phase I in FIG. 2. In this process:

The RN establishes an RRC connection with an eNB. The RN carries identity information of the RN in an RRC Connection Request or RRC Connection Setup Complete message.

The RN carries an IMSI in an Attach Request message as its own identity.

In this phase, if the serving eNB of the RN selects an MME which supports RN functionality, then the MME determines that the RN is performing the phase I (that is, what selected by the RN may possibly an eNB) upon knowledge of the RN accessing a network because the RN uses the IMSI as the identity, so the MME selects legacy SGW/PGW for the RN as in the prior art.

As an optimized alternative, the RN can firstly select a DeNB cell from a stored list of DeNB cells (if any) before attachment each time, and if none of detected cells is available, then the RN can further perform the phase I to download a new list of DeNB cells. If some of the detected cells are available, then the RN can perform the phase H directly and skip the process of the phase I. For example, the RN may not perform the process of the phase I upon powered up again after being powered off and moved to another location after operating as an eNB for a period of time.

Step 2: The RN performs the phase II in FIG. 2. In this process:

The RN selects an accessible DeNB cell, and the RN carries in an Attach Request message a GUTI allocated thereto at the network side in the phase I as its own identity.

The DeNB selects for the RN an MME which supports RN functionality. If the MME knows from an HSS that the type of the user is an RN indeed and the identity used in the Attach Request message is the GUTI, then the MME determines that the RN is performing the process of the phase II and then selects the current serving eNB, that is, the DeNB acts as both a PGW and an SGW of the RN.

After selecting the DeNB as a gateway node, the MME can take the IP address of an eNB function part in the DeNB directly as the IP address of the gateway node or can alternatively inquire a DNS system using the eNB identifier (eNB ID) of the DeNB for retrieving the IP address of a gateway function part of the DeNB.

The MME transmits a Create Session Request to the DeNB, and the DeNB creates an EPS bearer for the RN; and a subsequent process is performed as in the corresponding steps in the phase II in FIG. 2, and a repeated description thereof will be omitted here.

This embodiment differs from the first embodiment in that the RN carries the identity information of the RN consistently each time when an RRC connection is established in this embodiment while the RN carries no identity information of the RN when an RRC connection is established in the phase I but carries the identity information of the RN only when an RRC connection is established in the phase II in the first embodiment.

Eleventh Embodiment

In this embodiment, information to indicate a startup phase in which an RN currently resides is transmitted in an NAS message particularly as follows:

Step 1: An RN is powered up to perform the phase I in FIG. 2. In this process:

The RN carries no special identity indicator information in an Attach Request.

An identity information element in the Attach Request can be filled as in the step 1 of the second embodiment or can alternatively be filled as in the prior art, that is, if the RN has a valid GUTI stored, then the GUTI is carried; otherwise, an IMSI is carried.

In this phase, if an serving eNB of the RN selects an MME which supports RN functionality, then the MME determines that the RN is performing the phase I (that is, what selected by the RN may possibly an eNB) upon knowledge of the RN accessing a network because the MME does not obtain any special identity indicator information from the RN, so the MME selects legacy SGW/PGW for the RN as in the prior art.

Step 2: The RN performs the phase II in FIG. 2. In this process:

The RN selects an accessible DeNB cell, and the RN carries the special identity indicator information or indicator information requesting a local network to be selected in the Attach Request message.

The special identity indicator information can be a node type indicator field, the value of which is set to "RN", added in a "UE Network Capability" information element in the Attach Request message or a 1-bit RN type indicator added in the Attach Request message or indicator information of the phase of the startup procedure, i.e., the phase I or the phase II; or indicator information carried in other similar ways. The indicator information requesting a local network to be selected can be a Local GW indicator added in the Attach Request, and the MME determines upon reception of the indicator that the RN requests the MME for selecting a local gateway node for the RN.

The DeNB selects for the RN an MME which supports RN functionality. If the MME knows the identity information of the RN from the NAS message, then the MME checks subscription data for an RN information indicator. If the MME knows from an HSS that the type of the user is an RN indeed, then the MME selects the current serving eNB, that is, the DeNB acts as both a PGW and an SGW of the RN.

After selecting the DeNB as an SGW/PGW, the MME can take the IP address of an eNB function part in the DeNB directly as the IP address of the SGW/PGW or can alternatively inquire a DNS system using the eNB ID of the DeNB for retrieving the IP address of a gateway function part of the DeNB.

The MME transmits a Create Session Request to the DeNB, and the DeNB creates an EPS bearer for the RN; and a subsequent process is performed as in the corresponding steps in the phase II in FIG. 2, and a repeated description thereof will be omitted here.

This embodiment differs from the second embodiment in that the RN uses in the Attach Request message a user identity which is not defined in this embodiment.

Figure 8:
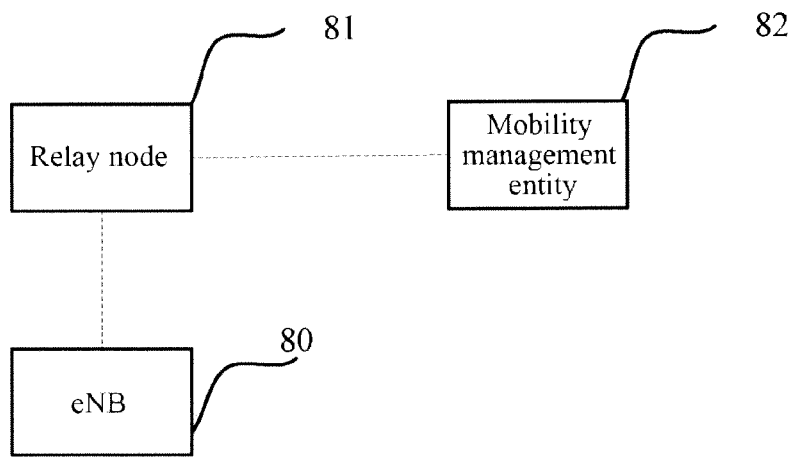
FIG. 8 is a schematic structural diagram of a system according to an embodiment of the invention.

Referring to FIG. 8, an embodiment of the invention further provides a wireless communication system including:

A relay node 80 configured to judge a currently performed phase of a startup procedure, to determine from a result of judgment whether to transmit, to the eNB, information for indicating the startup phase which the RN is currently performing and to transmit to the eNB the information for indicating the startup phase which the RN is currently performing upon positive determination;

The eNB 81 configured to forward to an MME selected for the RN the information for indicating the startup phase which the RN is currently performing upon reception of the information; and The mobility management entity 82 configured to determine whether the information, transmitted from the eNB, for indicating the startup phase which the RN is currently performing is received during RN attach procedure, and if so, to judge from the received information the startup phase which the RN is currently performing; otherwise, to judge the startup phase which the RN is currently performing based on a preconfigured rule of judging the startup phase of the RN; and to select legacy SGW and PGW located in the core network as gateway nodes of the RN upon judging that the RN is currently performing a startup phase I, and to select a DeNB of the RN as the PGW and SGW of the RN upon judging that the RN is currently performing a startup phase II.

Figure 9:
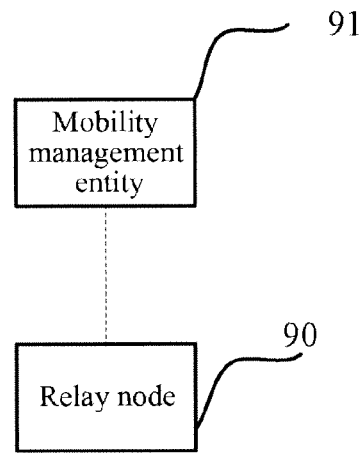
FIG. 9 is a schematic structural diagram of a system according to an embodiment of the invention.
Figure 10:
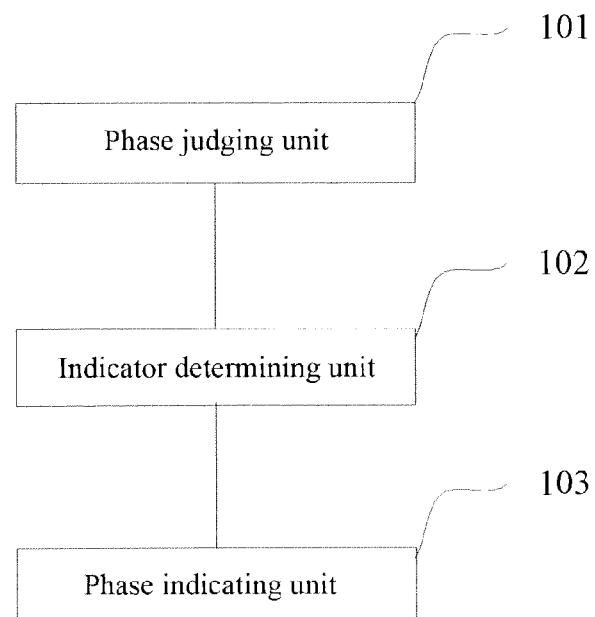
FIG. 10 is a schematic structural diagram of an RN according to an embodiment of the invention.

Referring to FIG. 9, an embodiment of the invention further provides a wireless communication system including:

A relay node 90 configured to judge a currently performed phase of a startup procedure, to determine from a result of judgment whether to transmit, to an MME, information for indicating the startup phase which the RN is currently performing and to transmit to the MME the information for indicating the startup phase which the RN is currently performing upon positive determination; and The mobility management entity 91 configured to determine whether the information, transmitted from the RN, for indicating the startup phase which the RN is currently performing is received during RN attach procedure, and if so, to judge from the received information the startup phase which the RN is currently performing; otherwise, to judge the startup phase which the RN is currently performing based on a preconfigured rule of judging the startup phase of the RN; and to select legacy SGW and PGW located in the core network as a gateway node of the RN upon judging that the RN is currently performing a startup phase I, and to select a DeNB of the RN as the PGW and SGW of the RN upon judging that the RN is currently performing a startup phase IL Referring to FIG. 10, an embodiment of the invention further provides a relay node which can be applicable to the system illustrated in FIG. 8 or FIG. 9 and which includes:

A phase judging unit 101 configured to judge the current startup phase;

An indicator determining unit 102 configured to determine from a result of judgment by the phase judging unit whether to transmit, to an eNB or an MME, information for indicating the startup phase which the RN is currently performing; and A phase indicating unit 103 configured to transmit to the eNB or the MME the information for indicating the startup phase which the RN is currently performing upon positive determination by the indicator determining unit.

The indicator determining unit 102 is configured:

To determine that it is unnecessary to transmit to the eNB or the MME the information for indicating the startup phase which the RN is currently performing when the phase judging unit judges that a phase I of the startup procedure is being performed; and to determine that it is necessary to transmit, to the eNB or the MME, information for indicating that the RN is currently performing a startup phase II upon judging that the phase II of the startup procedure is being performed, where the information is information for indicating that the RN is currently performing the startup phase II; or To determine that it is necessary to transmit, to the eNB or the MME, information for indicating that the RN is currently performing a startup phase I when the phase judging unit judges that the phase I of the startup procedure is being performed, where the information is information for indicating that the RN is currently performing the startup phase I; and to determine that it is necessary to transmit, to the eNB or the MME, information for indicating that the RN is currently performing a startup phase II upon judging that the phase II of the startup procedure is being performed and to transmit to the eNB or the MME the information for indicating that the RN is currently performing the startup phase II; or To determine that it is necessary to transmit to the eNB or the MME the information for indicating the startup phase which the RN is currently performing upon judging that a phase I of the startup procedure is being performed and to transmit, to the eNB or the MME, information for indicating that the RN is currently performing the startup phase I; and to determine that it is unnecessary to transmit to the eNB or the MME the information for indicating the startup phase which the RN is currently performing upon judging that a phase II of the startup procedure is being performed.

The information for indicating that the RN is currently performing the startup phase I is identity information of a UE or an IMSI or indicator information of the startup phase I, where the identity information of the UE is information indicating the type of the current communication node as a UE, and the indicator information of the startup phase I is information indicating the startup phase I.

The information for indicating that the RN is currently performing the startup phase II is identity information of the RN or a GUTI or indicator information of the startup phase II or indicator information requesting a local gateway to be selected, where the identity information of the RN is information indicating the type of the current communication node as an RN, and the indicator information of the startup phase II is information indicating the startup phase II.

The phase indicating unit 103 is configured:

To transmit to the eNB the information for indicating that the RN is currently performing the startup phase I or the information for indicating that the RN is currently performing the startup phase II in an AS message; and To transmit to the MME the information for indicating that the RN is currently performing the startup phase I or the information for indicating that the RN is currently performing the startup phase I in an NAS message.

The AS message is an RRC connection setup request message or an RRC connection setup complete message, and the NAS message is an Attach Request message or a Packet Data Network (PND) Connectivity Request message.

The phase indicating unit 103 is configured, when the AS message is the RRC connection setup request message, to transmit to the eNB the RRC connection setup request message with an RRC establishment cause field carrying the information for indicating that the RN is currently performing the startup phase I or the information for indicating that the RN is currently performing the startup phase I.

Figure 11:
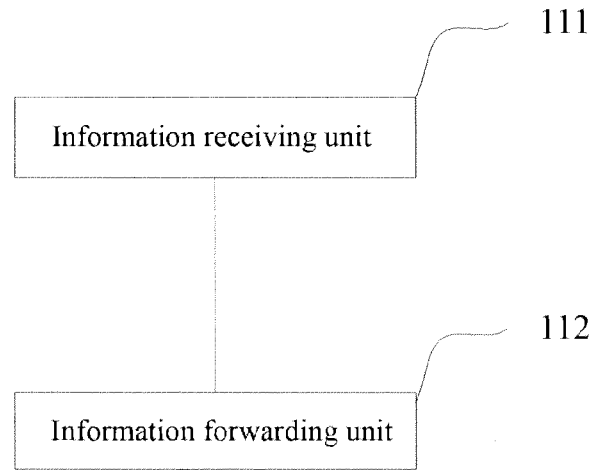
FIG. 11 is a schematic structural diagram of an eNB according to an embodiment of the invention.

Referring to FIG. 11, an embodiment of the invention further provides an eNB which can be applicable to the system illustrated in FIG. 8 and which includes:

An information receiving unit 111 configured to receive information, transmitted from an RN, for indicating the startup phase which the RN is currently performing; and An information forwarding unit 112 configured to forward to an MME selected for the RN the information for indicating the startup phase which the RN is currently performing.

The information for indicating the startup phase which the RN is currently performing is:

Information for indicating that the RN is currently performing a startup phase I or information for indicating that the RN is currently performing a startup phase II.

The information for indicating that the RN is currently performing the startup phase I is identity information of a UE or an IMSI or indicator information of the startup phase I, where the identity information of the UE is information indicating the type of the current communication node as a UE, and the indicator information of the startup phase I is information indicating the startup phase I.

The information for indicating that the RN is currently performing the startup phase II is identity information of the RN or a GUTI or indicator information of the startup phase II or indicator information requesting a local gateway to be selected, where the identity information of the RN is information indicating the type of the current communication node as an RN, and the indicator information of the startup phase II is information indicating the startup phase II.

The information receiving unit 111 is configured:

To receive the information, transmitted from the RN, for indicating the startup phase which the RN is currently performing, in an AS message which is an RRC connection setup request message or an RRC connection setup complete message.

The information forwarding unit 112 is configured:

To forward to the MME selected for the RN an S1-AP message carrying the information for indicating the startup phase which the RN is currently performing.

Figure 12:
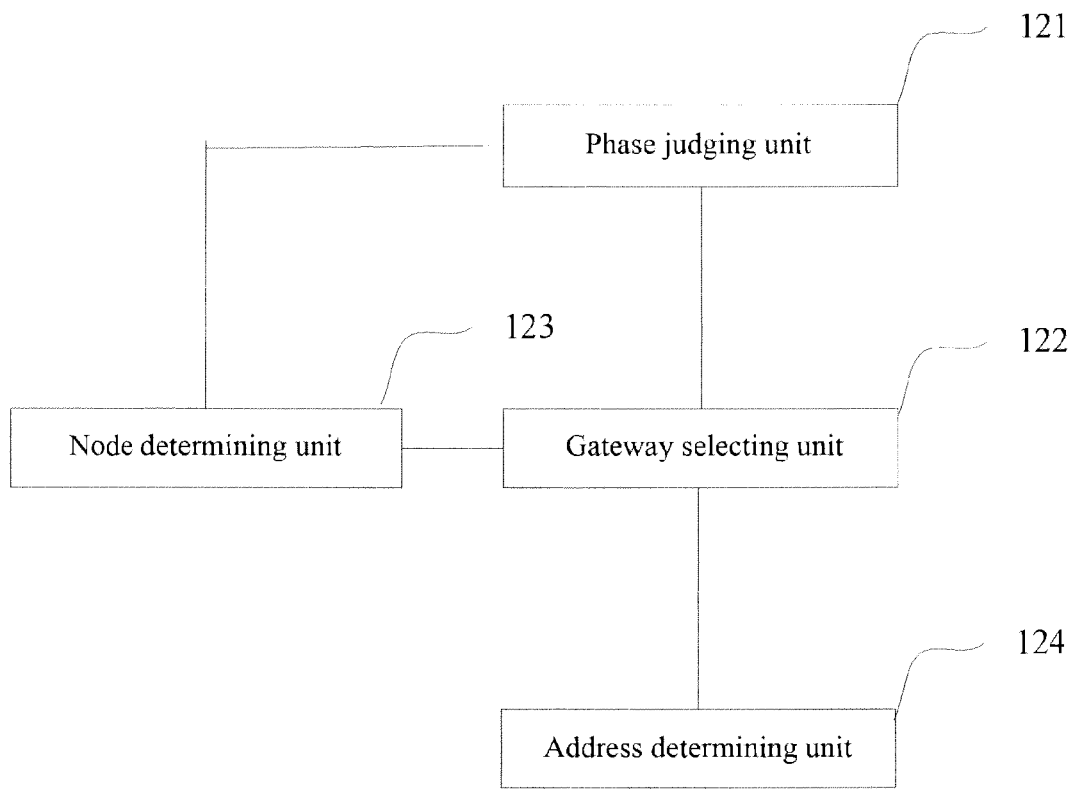
FIG. 12 is a schematic structural diagram of an MME according to an embodiment of the invention.

Referring to FIG. 12, an embodiment of the invention further provides a mobility management entity which can be applicable to the system illustrated in FIG. 8 or FIG. 9 and which includes:

A phase judging unit 121 configured to determine whether information, transmitted from an RN or an eNB, for indicating the startup phase which the RN is currently performing is received in an Attach procedure of the RN with the present mobility management entity, and if so, to judge from the received information the current startup phase; otherwise, to judge the startup phase which the RN is currently performing based on a preconfigured rule of judging the startup phase of the RN; and A gateway selecting unit 122 configured to select a legacy SGW and a PGW as gateway nodes of the RN when the phase judging unit judges that the RN is currently performing a startup phase I; and to select a DeNB of the RN as the PGW and SGW of the RN when the phase judging unit judges that the RN is currently performing a startup phase II.

The phase judging unit 121 is configured:

To determine whether an S1-AP message transmitted from the eNB or an NAS message transmitted from the RN carries the information for indicating the startup phase which the RN is currently performing; and if so, to determine that the information, transmitted from the RN or the eNB, for indicating the startup phase which the RN is currently performing is received; otherwise, to determine that the information, transmitted from the RN or the eNB, for indicating the startup phase which the RN is currently performing is not received, where the NAS message is an Attach Request message or a PDN Connectivity Request message.

The phase judging unit 121 is configured:

To determine whether an RRC establishment cause indicator field of the S1-AP message transmitted from the eNB carries the information for indicating the startup phase which the RN is currently performing or to determine whether the S1-AP message carries an access entity type indicator field as the information.

The phase judging unit 121 is configured:

To judge that the RN is currently performing the startup phase I when information for indicating that the RN is currently performing the startup phase I is identity information of a UE or an IMSI or indicator information of the startup phase I the MME determines, where the identity information of the UE is information indicating the type of the current communication node as a UE, and the indicator information of the startup phase I is information indicating the startup phase I; and To judge that the RN is currently performing the startup phase II when the information for indicating that the RN is currently performing the startup phase II is identity information of the RN or a GUTI or indicator information of the startup phase II or indicator information requesting a local gateway to be selected, where the identity information of the RN is information indicating the type of the current communication node as an RN, and the indicator information of the startup phase II is information indicating the startup phase II.

The rule of judging the startup phase of the RN is:

To judge that the RN is currently performing the startup phase II when the information for indicating the startup phase which the RN is currently performing is not received; or To judge that the RN is currently performing the startup phase I when the information for indicating the startup phase which the RN is currently performing is not received.

The relay node further includes:

A node determining unit 123 configured to determine whether the current communication node is an RN before the node selecting unit selects the DeNB of the RN as the PGW and the SGW of the RN; and Corresponding the gateway selecting unit 122 is configured:

To select the DeNB of the RN as the PGW and the SGW of the RN when the node determining unit determines that the current communication node is an RN.

The relay node further includes:

An address determining unit 124 configured to select the address of the DeNB as the address of the PGW and the SGW selected for the RN; or to inquire a DNS system using the eNB ID of the DeNB for retrieving the address of a gateway function part of the DeNB and to take the retrieved address as the address of the PGW and the SGW selected for the RN.

In summary the invention has the following advantageous effects:

In the solutions according to the embodiments of the invention, an RN decides, according to the startup phase which the RN is currently performing, information for indicating the startup phase which the RN is currently performing to be or not to be transmitted to an eNB or an MME; the eNB forwards to the MME the received information for indicating the startup phase which the RN is currently performing; and the MME judges the startup phase which the RN is currently performing according to the received information for indicating the startup phase which the RN is currently performing or based on a preconfigured rule of judging the startup phase and selects a legacy Serving Gateway (SGW) and a legacy packet data gateway (PGW) located in the core network as gateway nodes of the RN upon judging that the RN is currently performing the startup phase I; and selects the serving Donor eNB (DeNB) of the RN as the PGW and SGW of the RN upon judging that the RN is currently performing the startup phase II. As can be apparent, with the invention, the MME can select gateway nodes for the RN according to the startup phase which the RN is currently performing to thereby address the problem of how the MME selects gateway nodes for the RN.

Furthermore the inventive solutions can avoid improper operations when the MME supporting RN functionality selects for the RN an eNB as the gateway node when the RN performs the startup phase I.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting a startup phase indicator, the method comprising:
   judging, by a Relay Node, RN, a current startup phase; and
   transmitting, by the RN, to a serving eNB or Mobility Management Entity, MME, information for indicating the startup phase which the RN is currently performing, wherein the transmitting particularly comprises:
   when the RN is currently performing a startup phase I, the RN transmitting no information for indicating the startup phase which the RN is currently performing to the eNB or the MME, and when the RN is currently performing a startup phase II, the RN transmitting information for indicating that the RN is currently performing the startup phase II to the eNB or the MME;
   wherein the information for indicating that the RN is currently performing the startup phase II is: a Globally Unique Temporary Identity, GUTI.

2. The method according to claim 1, wherein the RN transmits to the eNB the information for indicating the startup phase which the RN is currently performing in an Access Stratum, AS, message; and
   the RN transmits to the MME the information for indicating the startup phase which the RN is currently performing in a Non Access Stratum, NAS, message.

3. A method for forwarding a startup phase indicator, the method comprises:
   receiving, by an eNB, information, transmitted from a Relay Node, RN, for indicating a startup phase which the RN is currently performing; and
   forwarding, by the eNB, to a Mobility Management Entity, MME, selected for the RN the information for indicating the startup phase which the RN is currently performing;
   when the RN is currently performing a startup phase I, the RN transmitting no information for indicating the startup phase which the RN is currently performing to the eNB;
   wherein the information for indicating the startup phase which the RN is currently performing is: information for indicating that the RN is currently performing startup phase II; and
   wherein the information for indicating that the RN is currently performing the startup phase II is: a Globally Unique Temporary Identifier, GUTI.

4. The method according to claim 3, wherein the eNB receives the information, transmitted from the RN, for indicating the startup phase, which the RN is currently performing in an Access Stratum, AS, message.

5. The method according to claim 3, wherein forwarding, by the eNB, to an MME selected for the RN the information for indicating the startup phase which the RN is currently performing comprises:
   forwarding, by the eNB, to the MME selected for the RN an S1-AP message carrying the information for indicating the startup phase which the RN is currently performing.

6. A method for gateway node selection, the method comprising:
   determining, by a Mobility Management Entity, MME, whether information, transmitted from a Relay Node, RN, or an eNB, for indicating startup phase which the RN is currently performing is received in RN attach procedure;
   judging, by the MME, that the RN is currently performing a startup phase I when no information for indicating the startup phase which the RN is currently performing is received, and judging that the RN is currently performing a startup phase II when the information for indicating the startup phase which the RN is currently performing is received; and
   selecting, by the MME, a legacy Serving Gateway, SGW, and a legacy packet data gateway, PGW, as gateway nodes of the RN upon judging that the RN is currently performing the startup phase I; and
   selecting, by the MME, a Donor eNB, DeNB, of the RN as PGW and SGW of the RN upon judging that the RN is currently performing the startup phase II;
   wherein the information for indicating the startup phase which the RN is currently performing is: information for indicating that the RN is currently performing the startup phase II; and the information for indicating that the RN is currently performing the startup phase II is: a Globally Unique Temporary Identity, GUTI.

7. The method according to claim 6, wherein the determining whether information, transmitted from an RN or an eNB, for indicating startup phase which the RN is currently performing is received comprises:
   determining, by the MME, whether a Non Access Stratum, NAS, message transmitted from the RN carries the information for indicating the startup phase which the RN is currently performing, or determining whether the NAS message carries an access entity type indicator field as the information indicating the startup phase which the RN is currently performing; or
   determining, by the MME, whether an RRC establishment cause indicator field of an S1-AP message transmitted from the eNB carries the information for indicating the startup phase which the RN is currently performing, or determining whether the S1-AP message carries an access entity type indicator field as the information indicating the startup phase which the RN is currently performing.

8. The method according to claim 6, wherein after the MME judges that the RN is currently performing the startup phase II and before the MME selects the DeNB of the RN as the PGW and the SGW of the RN, the method further comprises:
   determining, by the MME, that the current communication node is an RN.

9. A mobility management entity, the mobility management entity comprising:
   a memory, and
   a processor; wherein the memory has computer readable program codes stored therein, and the processor are configured to execute the computer readable program codes to perform:
   determining whether information, transmitted from a Relay Node, RN, or an eNB, for indicating a startup phase which the RN is currently performing is received during RN attach procedure;
   judging that the RN is currently performing a startup phase I when no information for indicating the startup phase which the RN is currently performing is received, and judging that the RN is currently performing a startup phase II when the information for indicating the startup phase which the RN is currently performing is received;
   selecting a legacy Serving Gateway, SGW, and a legacy packet data gateway, PGW, as gateway nodes of the RN upon judging that the RN is currently performing the startup phase I; and selecting the Donor eNB, DeNB, of the RN as PGW and SGW of the RN upon judging that the RN is currently performing the startup phase II;
   wherein the information for indicating the startup phase which the RN is currently performing is: information for indicating that the RN is currently performing the startup phase II; and the information for indicating that the RN is currently performing the startup phase II is: a Globally Unique Temporary Identity, GUTI.

10. The mobility management entity according to claim 9, wherein the processor are further configured to execute the computer readable program codes to perform:

determining whether a Non Access Stratum, NAS, message transmitted from the RN carries the information for indicating the startup phase which the RN is currently performing, or determining whether the NAS message carries an access entity type indicator field as the information for indicating the startup phase which the RN is currently performing; or determining whether an RRC establishment cause indicator field of an S1-AP message transmitted from the eNB carries the information for indicating the startup phase which the RN is currently performing, or determining whether the S1-AP message carries an access entity type indicator field as the information for indicating the startup phase which the RN is currently performing.

11. The mobility management entity according to claim 9, the processor are further configured to execute the computer readable program codes to perform:

determining that the current communication node is an RN before selecting the DeNB of the RN as the PGW and the SGW of the RN.

\* \* \* \* \*